April 29, 1958  J. M. WALTER  2,832,849
MACHINE TOOL PENDANT

Filed April 12, 1954  2 Sheets-Sheet 1

INVENTOR.
John M. Walter.
BY Wood, Herron & Evans,
ATTORNEYS.

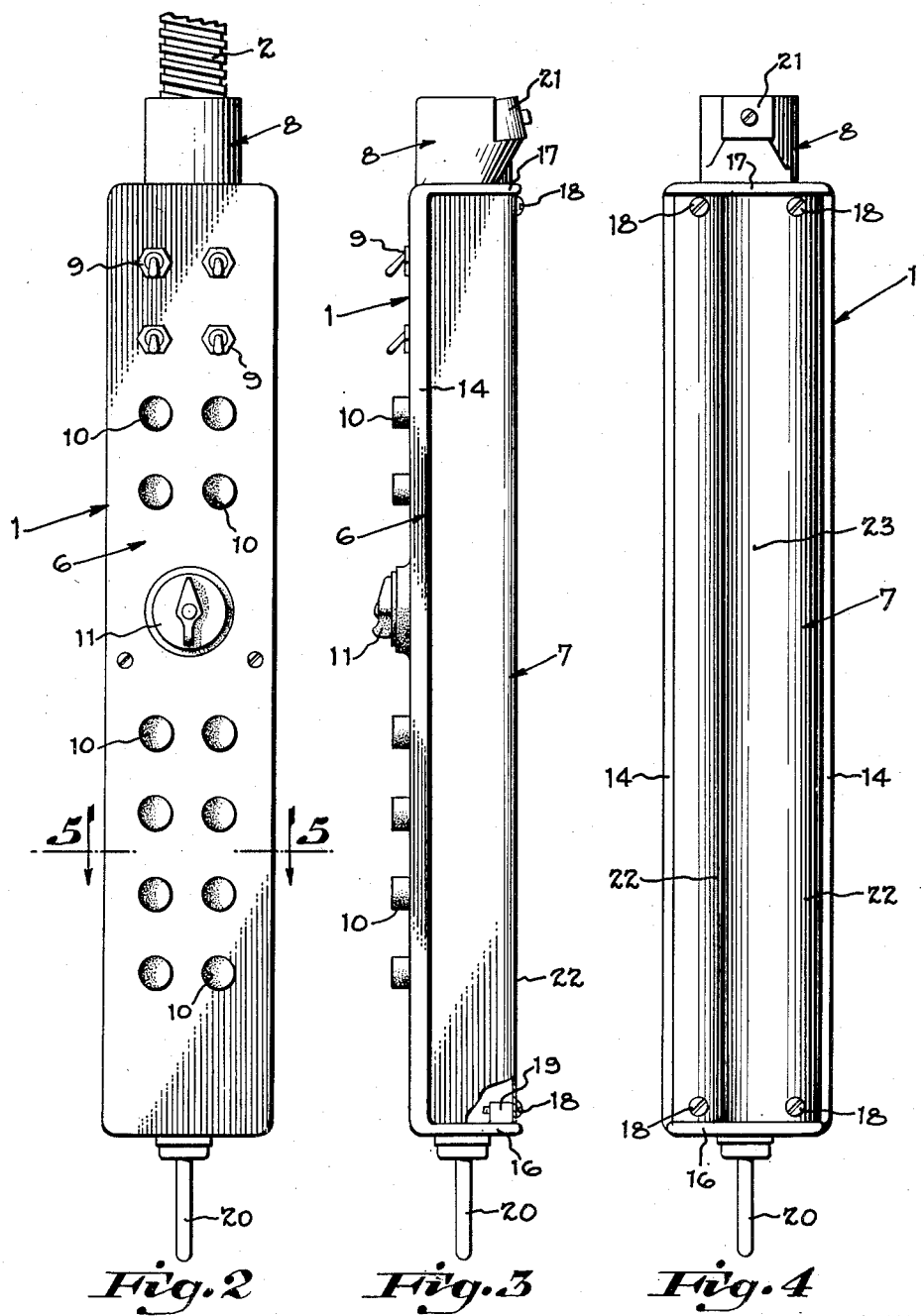

United States Patent Office 2,832,849
Patented Apr. 29, 1958

2,832,849

MACHINE TOOL PENDANT

John M. Walter, Cincinnati, Ohio, assignor to G. A. Gray Company, Cincinnati, Ohio, a corporation of Ohio Application April 12, 1954, Serial No. 422,464

3 Claims. (Cl. 200—5)

This invention relates to machine tools, and is directed to an improved pendant through which such apparatus is manually controlled by an operator.

The pendant of the present invention is adapted particularly for use with planers, horizontal boring mills, planer-type milling machines and similar equipment which is of large size and which is used for performing various machining operations upon large and cumbrous work pieces, or upon small-sized work pieces arranged in multiples or in succession.

In the operation of such apparatus, the work site may extend over a substantial area, and it is frequently necessary for the operator to walk from one point to another for inspection or to make adjustments. Also, many machines of the general type described have two or more work heads, located, for example, at opposite sides of the machine or on cross slides which extend above, or bridge, the work table. Since an operator, in the course of utilizing the machine, may be required to move from one side of the machine to the other, or to move from the floor to a relatively elevated position in order to watch the progress of machining, make measurements or adjustments, it is not practical to locate the control panel of the machine at a central point, as is common in equipment of smaller size. To accommodate the operator's movements, equipment of the type described is furnished with the control panel in the form of a pendant suspended from an arm which is located usually at the top of the machine, the arm and suspension means being freely movable to various work sites around the apparatus in order that the pendant may be moved to positions in which the pendant is conveniently accessible to the operator.

At the pendant, various control buttons, switch handles and the like are provided. Through the manual manipulation of these, the operator is enabled to control movement of the machine table, start and stop the tool spindles, move the tool heads upwardly or downwardly upon their slides, etc, as required in the machining of work pieces. There may be as many as 20 or 30 different buttons or control elements on the face of a pendant, the number depending upon the various elements of the machine which must be controlled during its use.

Since efficient operation of a large machine tool of the type described is dependent to an appreciable degree upon the rapidity and accuracy with which the operator is able to control the machine, it is a principal objective of this invention to provide a pendant within which control elements such as buttons, knobs or the like may be mounted in positions which are conveniently accessible to the operator's fingers, but which are housed in a casing which is light in weight, yet sufficiently strong to withstand the knocks and bumps imparted to it during ordinary usage of the apparatus. More specifically, the invention is based upon the concept of providing a machine tool pendant having a light-weight casing which, by its configuration, is very strong, but which also furnishes a convenient finger rest to the operator, facilitating his grasp of the unit and his manual manipulation of the control elements thereof without suffering the fatigue that might otherwise lead to errors in the operation of the controls.

The conventional pendant is an elongated box suspended by means of a pipe or cable from an elevated overarm. The controls are mounted at a face panel of the box, usually in vertical rows, the wiring for the controls being housed within the box and extending upwardly through the pipe or conduit. The pendant of the present invention is of this general type, but the invention contemplates, first, a casing of light weight, which by its low inertia reduces operator's arm fatigue; secondly, the casing is concavo-convexly curved or longitudinally ribbed at its rear face, to provide lengthwise stiffness through which the casing is capable of sustaining the ordinary bumps and knocks imparted to it during machine use. Thirdly, the spacing of the concavo-convex back of the casing with respect to the controls at the front panel, is such that the placing of the operator's hand along the side of the casing disposes the thumb in position to engage push buttons and/or the like at the casing face, while the mid portions of the fingers rest over the convex part of the back wall, and while the ends of the fingers rest within and find their purchase upon the concave part thereof. By this latter feature, the operator conveniently is enabled to grasp the pendant at any elevation along its length or height, with proper positioning of the fingers at the back side of the pendant to facilitate engagement of the thumb with a push button control at the front side.

By making the pendant light in weight and easy to grasp, the operator's fingers suffer less fatigue, and experience has shown that the errors in improperly controlling the machine are reduced. In this respect, it must be remembered that fatigue is not an inconsequential factor since, in ordinary daily operation, the operator's hand may be engaging the pendant as much as 50% of the time or more.

A pendant typically embodying the respective features of this invention is shown in the accompanying drawings, in which:

Figure 2 is a vertical elevation of the face of the pendant, to illustrate one typical arrangement of control buttons thereon;

Figures 3 and 4 are respective side and rear elevations of a pendant constructed according to this invention.

Figure 1:
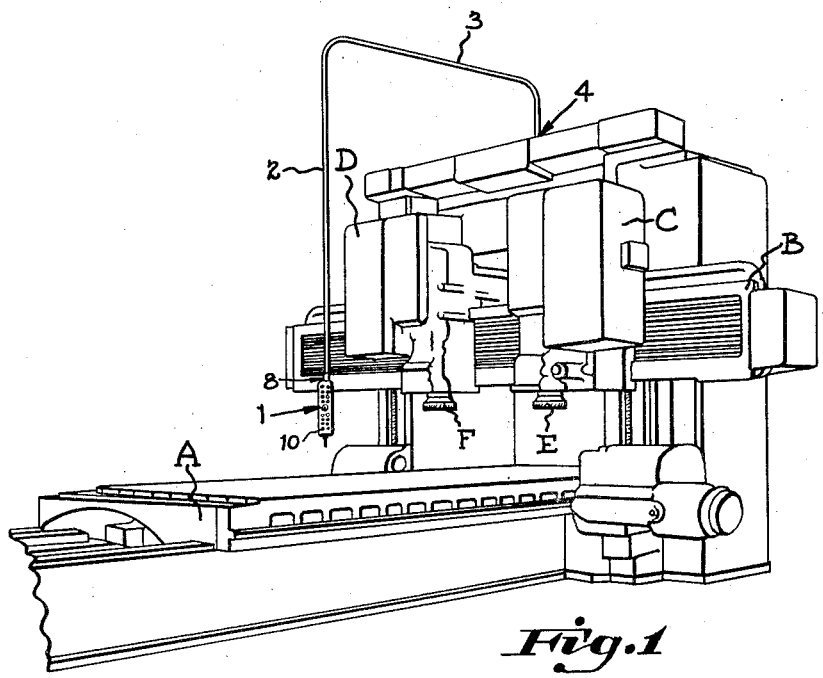
Figure 1 is a perspective view of a planer-type milling machine equipped with a control pendant, to show the general environment of use.

As shown in Figure 1, a large machine tool such as the planer-type miller shown in Figure 1, is equipped with a pendant indicated generally at 1, which is suspended by means of a flexible or stiff conduit 2 from a relatively rigid overarm portion 3, which is pivotally mounted as indicated generally at 4, at the top of the tool or at some convenient point thereon. The pendant 1 is located above the floor at a level convenient to the operator's reach, and the swingability of the overarm 3 enables the pendant to be moved to various locations at the working area of the machine on either side thereof.

The pendant shown in Figures 2 to 5 consists of a front panel indicated geenrally at 6, a casing indicated generally at 7, and a connector indicated generally at 8.

The front panel member 6 is bored to receive the various switches 9, push butons 10, and such other control apparatus as potentiometer 11, which may be required for the control of the equipment which the pendant is to serve. For example typical in apparatus of the kind shown, the control buttons of the pendant are arranged to govern, electrically, the movement in back and forth directions of the machine table A, the raising or lowering of the cross-slide B, the inward or outward movement of the respective heads C and D, as well as the rotation of the spindles E and F (the latter not shown) of the heads C and D. Various other control buttons may be necessary, such as jog switches through which any one of the movable members might be "inched" or moved incrementally. Even with the relatively small number of control elements which are shown respectively in Figure 2, the pendant inherently is of an elongated nature.

Casing 7 is of channel configuration and, with the front panel 6, forms an enclosure 12 within which the back-panel portions of the control elements 9–11 are housed, and within which the multiplicity of electric wires which lead from these control elements are also nested. The wires are indicated in cross-section at 13.

In the preferred construction, panel member 6 has bead portions 14 at its opposite side edges. These are slotted, as at 15, to receive the marginal edgewise portions of the casing 7 at the open channel face thereof. This construction provides a dust-tight interconnection of the casing and panel. Also, the top and bottom portions of the casing carry lateral projections 16 and 17, which form the top and bottom members for the enclosure 12. The casing 7 is of such length that it fits between these end closures. The casing may be held in place either by frictional engagement of the marginal portions thereof in the slots 15, or in any suitable manner, such as by screws 18 which project through the back side of the casing into threaded engagement with lugs 19 projecting from the end closure portions 16 and 17.

The lower portion of the pendant may, if desired, be provided with an emergency stop switch stick 20, which may be deflected from any angle to cause the emergency switch to stop the machine.

At the top portion of the pendant, connector 8 is utilized to provide an interconnection of the pendant with the conduit or pipe 2. This interconnector element may be any suitable type of coupling, the one shown in Figures 3 and 4 being of the kind wherein fastening to the conduit is provided by a wedge clip 21. It will be observed that the bottom and top closures of the pendant and the coupling 8 are not features of the present invention, and those skilled in the art readily will understand that various other constructions may be utilized.

Casing 7 may be formed of sheet metal, but preferably is fabricated of molded or formed laminated plastic composition, for example, Formica approximately 1/16" thick. Since this material is electrically non-conductive, large clearances are not required between the case and the switch connection lugs, even though 120-volt current or the like is used for energizing the control circuits. The casing, therefore, may be small in cross-section. Front panel 6 may also be of molded plastic composition or in the form of a light-weight aluminum casting.

Figure 5:
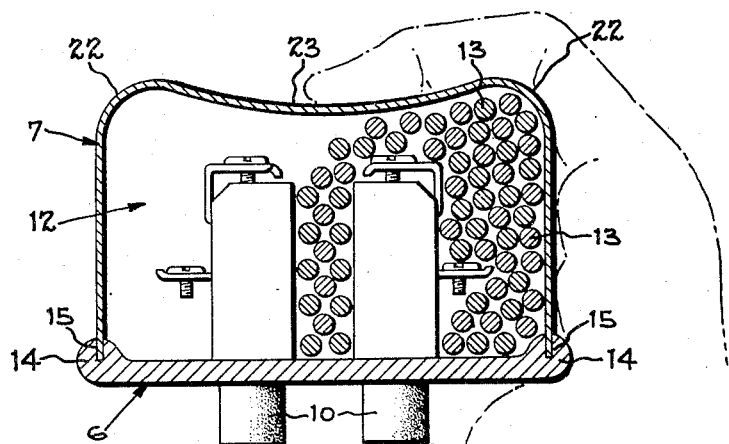
Figure 5 is a cross-sectional view taken on the line 5—5 of Figure 2.

Being of light weight, elements 6 and 7 are not inherently strong. However, the back portion of casing 7 comprises convexly-curved edge or corner portions 22, 22, integrally joining one another through a central concave portion 23. This shape, as shown in cross-section in Figure 5, is preserved throughout the length of the channel. This configuration functions to impart longitudinal rigidity to the elongated pendant unit, thereby enabling it to withstand knocks and bumps during usage even though the casing and face panel elements are fabricated of light-weight materials.

In addition to this feature, the configuration of the casing at the back side, as described, functions to facilitate the operator's grasping of the unit and his manipulation of its controls. More specifically, casing 7 is so dimensioned that the thickness of the pendant, measured from the front of the panel 6 to the rear of the casing 7, approximates the length of the palm portion of an operator's hand. Accordingly, when the hand is placed laterally across the side of the pendant, for instance, at its right side, the fingers rest over the convex portion of the casing 22, the finger extremities reside in the concave portion 23 while the cheek of the thumb rests on the marginal face portion of the panel 6. This inherently disposes the thumb in position to engage an adjacent push button or control element. Therefore, the operator's hand may grasp the pendant firmly yet comfortably to enable exertion by the thumb of any pressure that may be required to manipulate the push button or control, regardless of whatever spring pressure must be overcome in such actuation.

Commonly, the right hand of a right-handed operator is used to engage the pendant. However, it is frequently necessary for the controls in the left-hand vertical row to be manipulated. In this event, either the operator's left hand may grasp the pendant, at the left-hand side but in the manner just described, or the operator, with the right hand, may reach around the back of the pendant, rotating it as he does, with or without incidental twisting of the suspension tube, so as to dispose the base of the hand on the concave surface 23 with the fingers pointing to the front just inside the left-hand convex portion 22. This disposes the operator's palm along the left-hand side of the pendant and predisposes the operator's fingers in such position that an adjacent control element in the left-hand column may be manipulated.

Either way, the pendant is grasped comfortably and with much greater ease and certainty than theretofore has been possible with conventional structures. Inasmuch as these factors reduce the fatigue to which the operator's arm or fingers otherwise would be subjected, the margin for errors in control manipulation is eliminated and the production of the equipment is accordingly increased.

I claim:

1. A control pendant for a machine tool comprising, a front face member presenting manually manipulable electrical control elements longitudinally distributed, an elongated channel having a rear wall which is longitudinally indented and having at least one convexly arcuate longitudinal corner portion, said control elements having portions thereof disposed within said channel, said channel forming a wireway, the thickness of the pendant from the said front face member to the rear of the said channel being such as to afford comfortable grip for the hand whereby the control elements on the said front face member may be operated by the thumb of a hand placed along the side of the channel while the fingers extend over the convexly arcuate corner portion and find purchase on the longitudinally indented portion of the rear wall, and the exterior surface of the said rear indented wall and the said corner portion being smooth to present a longitudinal guide for the hand in moving selectively from one control element on the front face to another.

2. A control pendant as defined in claim 1 wherein the longitudinal corner portion of the elongated channel at each side of the longitudinal indentation of the rear wall is convexly arcuate.

3. A control pendant for a machine tool comprising, an elongated front face member having side edgewise portions longitudinally recessed, an elongated channel which is substantially coextensive with said front face member, the said channel having marginal portions of its side walls respectively engaging the said recesses, the said front face member having a plurality of electrical control devices mounted thereon in longitudinal distribution, which devices present manually-operable portions accessible at the face of said front face member and have portions extending into said channel, the said channel forming a wireway and having a rear wall which is longitudinally indented in cross section and having at least one convexly arcuate longitudinal corner portion, the said longitudinally indented rear wall and convexly arcuate corner portion serving to stiffen and rigidify the said channel, the thickness of said pendant from the said indented rear wall of the channel to the said front face being such as to be spanned comfortably by the hand of an operator, whereby the control elements on said front face member may be operated by the thumb of a hand placed along the side wall of the channel while the fingers extend over the said convexly arcuate corner portion and and find purchase on the longitudinally indented portion of the rear wall, the exterior surface of the said rear indented wall and corner portion being smooth to present a longitudinal guide for the hand in moving selectively from one control element on the front face to another, and end closures for said channel, one of said end closures having means associated therewith for interconnecting the pendant to a wire conduit.

References Cited in the file of this patent

UNITED STATES PATENTS

| | | |
|---|---|---|
| 1,018,356 | Hastings | Feb. 20, 1912 |
| 2,025,981 | Getty | Dec. 31, 1935 |
| 2,321,180 | Bradbury | June 8, 1943 |
| 2,390,846 | Obszarny | Dec. 11, 1945 |
| 2,466,414 | Gits et al. | Apr. 5, 1949 |
| 2,485,340 | Warmey | Oct. 18, 1949 |
| 2,486,591 | Ferrante | Nov. 1, 1949 |
| 2,487,011 | Wilhide | Nov. 1, 1949 |
| 2,508,956 | Litwin | May 23, 1950 |
| 2,523,170 | Wickerham | Sept. 19, 1950 |
| 2,543,450 | Feagin | Feb. 27, 1951 |

FOREIGN PATENTS

| | | |
|---|---|---|
| 615,404 | France | Oct. 11, 1926 |
| 524,144 | Great Britain | July 31, 1940 |
| 737,460 | Germany | July 14, 1943 |
| 916,149 | France | Apr. 12, 1946 |